March 26, 1963

D. WEBER 3,083,316

SINGLE-CAVITY MAGNETRON WITH VARIABLE OSCILLATING FREQUENCY

Filed Nov. 3, 1959

2 Sheets-Sheet 1

INVENTOR

Dieter Weber

BY Pierce, Scheffler & Parker

ATTORNEYS

INVENTOR
Dieter Weber
BY Pierce, Scheffler & Parker
ATTORNEYS

United States Patent Office 3,083,316

Patented Mar. 26, 1963

3,083,316
SINGLE-CAVITY MAGNETRON WITH VARIABLE OSCILLATING FREQUENCY

Dieter Weber, Killwangen, Switzerland, assignor to Patelhold Patentverwertungs- & Elektro-Holding A.-G., Glarus, Switzerland Filed Nov. 3, 1959, Ser. No. 850,630
Claims priority, application Switzerland Nov. 3, 1958
2 Claims. (Cl. 315—39.53)

This invention relates to electrical oscillators and more particularly to those of the single-cavity magnetron type.

The oscillating structure of a single-cavity magnetron consists, as known, of a metallic, toroidal hollow body whose surface next to the axis is divided into a number of anodes which are connected in two groups with the two side walls of the hollow body, which are, for example, perpendicular to the axis. The anodes or segments of the two groups are interdigitated and the two groups have opposite polarities. The inherent frequency of such an oscillating system is substantially determined by the capacitance between the two anode groups and by the inductance of the hollow body. It is known to influence the inherent frequency within certain limits either for frequency regulation or for frequency modulation, by transforming over a so-called tuning line a variable reactance into the oscillating system. The coupling of a tuning line with the oscillating system is effected either inductively by means of a coupling loop arranged in the hollow space or galvanically by direct connection of the two conductors of the tuning line to one anode each.

Lines which are connected like the above described tuning line with the oscillating system can also be used for power discoupling.

In single-cavity magnetrons for higher powers (over about 1 kw.) and higher frequencies (about 4 kilomegacycles and more) it was found that the known types of couplings have certain disadvantages since they effect a field distortion which jeopardizes the electron mechanism and since the coupling is much looser than it is desirable in view of an at least approximately constant power delivery in a relatively large frequency range.

It is the object of the invention to eliminate the above described disadvantages. One then has a relative tuning range which is much greater than that of the known single-cavity magnetrons. The invention relates to a single-cavity magnetron the resonating system of which is coupled with a coaxial line. It is characterized in that the inner conductor of the coaxial line is situated completely outside of the cavity of the resonating system and that it is connected with the free ends of all anode segments of the same polarity. The inner conductor is so designed that it has, at the same time, the function of a short-circuiting ring, which can be attached on any anode segment group in known manner to increase the oscillating stability of the resonating system of a single-cavity magnetron. A particularly advantageous embodiment is formed when the inner conductor of the coaxial line is situated concentrically to the axis of the resonating system.

Figure 1:
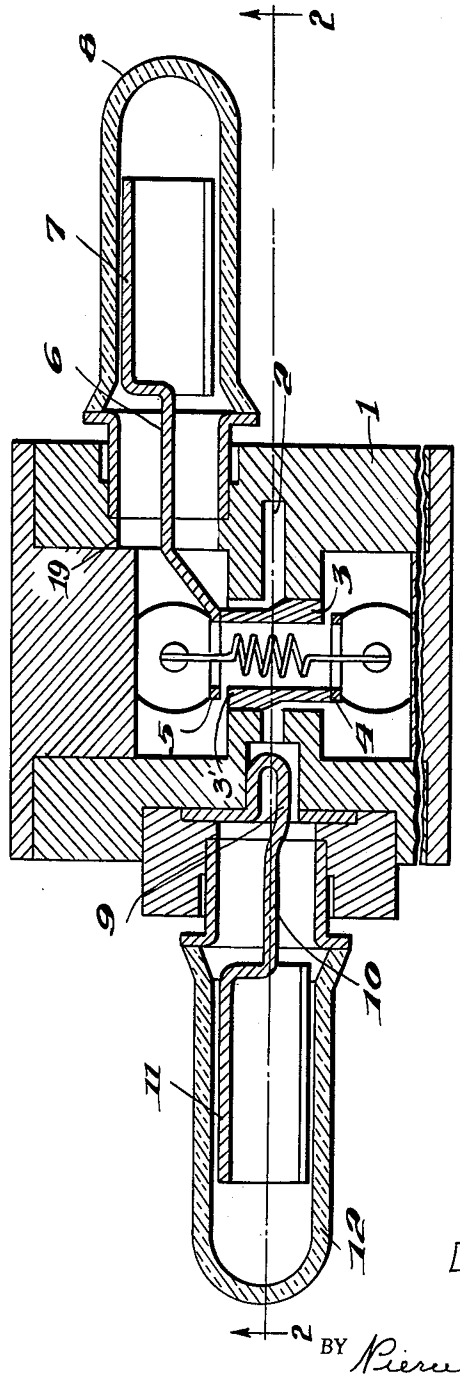
Figure 2:
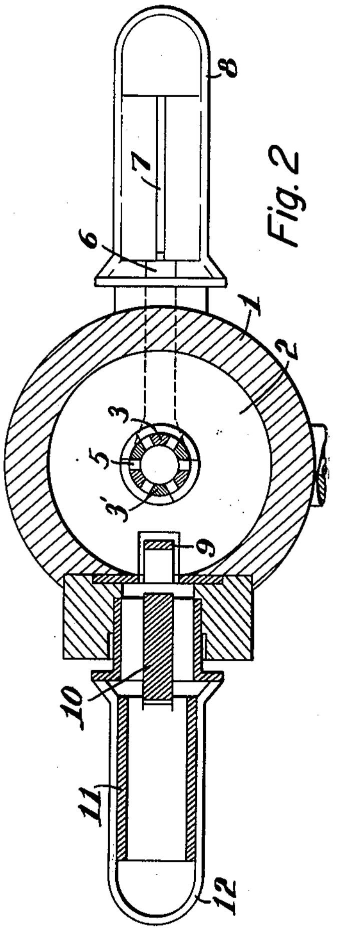
Figures 3, 4:
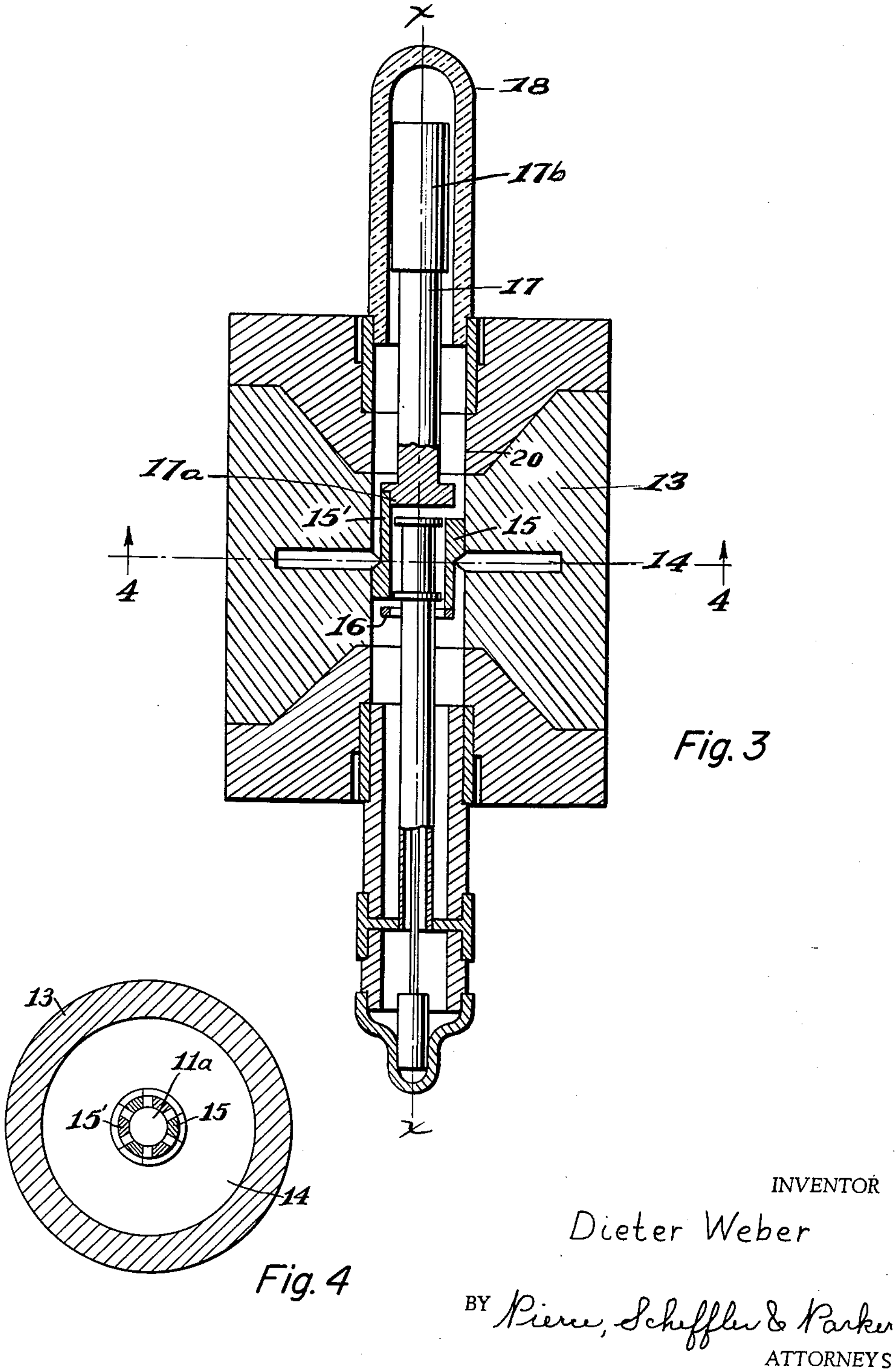

Two embodiments of the invention are represented in the accompanying drawings. FIG. 1 illustrates one embodiment in central longitudinal section and FIG. 2 is a transverse section taken on line 2—2 of FIG. 1. FIG. 3 illustrates another embodiment in central longitudinal section and FIG. 4 is a transverse section taken on line 4—4 of FIG. 3.

The resonating system of the magnetron according to FIGS. 1 and 2 consists of a body 1 which encloses a toroidal hollow cavity 2 and a conventional arrangement of anode segments which form a cylindrical interdigitated structure of two groups of interlacing metallic fingers of opposite polarity. The free ends of all of the fingers 3 of a group having one polarity (only one such finger being shown) are connected with each other by a short circuiting ring 5. A ring 4 connects in the same manner the free ends of all fingers 3' of opposite polarity belonging to the other group. In accordance with the invention, a coaxial line is coupled to the resonating system of the magnetron in such manner that the inner conductor of that line is situated completely outside of the cavity of the resonating system and that such inner conductor being connected with the free ends of all the fingers of one group thus functions simultaneously as a ring short circuiting the free ends of the fingers. Thus the short circuiting ring 5 is seen to be constructively a part of the inner conductor 6 of a coaxial line the outer conductor of which is formed by a cylindrical bore 19 in the hollow body 1. The conductor 6 is situated completely outside of the cavity 2 and is continued in the cylinder 7 arranged inside the glass part 8 forming an evacuated vacuum envelope, and which serves for the capacitative coupling of the tuning means to be connected on the outside. The decoupling of the power is effected in the represented example over the coupling loop 9, arranged in the hollow cavity 2, the conductor 10 and the cylinder 11, provided for capacitative coupling, which is arranged within the glass envelope 12.

The oscillating or resonating system according to FIGS. 3 and 4 consists of the body 13 which encloses the toroidal cavity 14 and of two oppositely poled groups of interdigitated metallic fingers 15, 15' which form the segmented anode structure. The free ends of the fingers 15 of one segmented anode group, only one such finger being shown in FIG. 3, are all interconnected by means of a short circuiting ring 16. In accordance with the invention, the inner cylindrical conductor 17 of a coaxial line, the outer conductor of which is formed by the cylindrical bore 20 in hollow body 13 and which is coupled to the resonating system is situated completely outside of the resonator cavity 14 and is connected at its inner cylindrical end 17a to the free ends of all the fingers 15' of the other segmented anode group thus also serving to short circuit them as well as couple the coaxial line to the resonator cavity. This embodiment differs from that of FIG. 1 in that the inner conductor 17 of the coaxial line is arranged concentrically with axis *x—x* of the resonator system. The outer thickened end 17b of the inner conductor is arranged inside the glass, or ceramic part 18 forming an evacuated envelope and serves to connect the tuning and/or power decoupling means arranged outside.

I claim:

1. A single cavity cylindrical magnetron having a resonating system constituted by a hollow body establishing a toroidal cavity and anode segments connected to said cavity which form an interdigitated structure of two groups of interlacing metallic fingers of opposite polarity, and a coaxial line coupled to said resonating system, the outer conductor of said coaxial line being connected to the inner wall of said hollow body, the inner conductor of said coaxial line being situated completely outside of said cavity, and said inner conductor itself being joined to and directly interconnecting the free ends of all fingers of one of said groups thus simultaneously functioning as a ring short-circuiting said free ends of said fingers.

2. A single-cavity cylindrical magnetron as defined in claim 1 wherein said inner conductor of said coaxial line is arranged concentrically with the axis of the resonating system of the magnetron.

References Cited in the file of this patent

UNITED STATES PATENTS

| | | |
|---|---|---|
| 2,497,436 | Brown | Feb. 14, 1950 |
| 2,721,294 | Shelton | Oct. 18, 1955 |

OTHER REFERENCES

Microwave Magnetrons, by Collins, MIT Rad. Lab. Series, McGraw-Hill, 1948, pages 118 to 121.